US009602266B2

(12) United States Patent
Song et al.

(10) Patent No.: US 9,602,266 B2
(45) Date of Patent: Mar. 21, 2017

(54) METHOD AND APPARATUS FOR SCHEDULING USE OF RADIO RESOURCES IN A WIRELESS NETWORK

(71) Applicant: Marvell World Trade Ltd., St. Michael (BB)

(72) Inventors: Leilei Song, Sunnyvale, CA (US); Hui-Ling Lou, Sunnyvale, CA (US); Yi-Ling Chao, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 208 days.

(21) Appl. No.: 14/523,747

(22) Filed: Oct. 24, 2014

(65) Prior Publication Data

US 2015/0124676 A1 May 7, 2015

Related U.S. Application Data

(60) Provisional application No. 61/899,438, filed on Nov. 4, 2013.

(51) Int. Cl.
| | |
|---|---|
| *H04W 4/00* | (2009.01) |
| *H04L 5/00* | (2006.01) |
| *H04L 1/18* | (2006.01) |
| *H04W 52/02* | (2009.01) |
| *H04J 11/00* | (2006.01) |
| *H04W 72/12* | (2009.01) |

(52) U.S. Cl.
CPC ........ *H04L 5/0073* (2013.01); *H04J 11/0023* (2013.01); *H04L 1/1854* (2013.01); *H04L 5/001* (2013.01); *H04L 5/0005* (2013.01); *H04L 5/0062* (2013.01); *H04W 52/0216* (2013.01); *H04W 72/1215* (2013.01); *H04L 1/1819* (2013.01)

(58) Field of Classification Search
CPC ... H04L 5/0073; H04L 1/1854; H04L 5/0062; H04L 5/0005; H04L 5/001; H04L 1/1819; H04J 11/0023; H04W 72/1215; H04W 52/0216
USPC .......................... 370/329, 330, 331, 252, 254
See application file for complete search history.

(56) References Cited

U.S. PATENT DOCUMENTS

| | | | |
|---|---|---|---|
| 9,094,999 B2 * | 7/2015 | Jechoux | H04W 88/06 |
| 2012/0176924 A1 * | 7/2012 | Wu | H04W 72/0406 370/252 |

(Continued)

OTHER PUBLICATIONS

"International Search Report and Written Opinion", Application No. PCT/IB2014/002952, Apr. 21, 2015, 12 Pages.

(Continued)

*Primary Examiner* — Chuong T Ho

(57) ABSTRACT

The present disclosure describes techniques and apparatuses for scheduling use of radio resources in a wireless network. In some aspects a method is described that includes receiving an indication from a mobile device of an in-device coexistence problem, and determining, from the parameters in the received indication, one or more component carriers of the carrier aggregation affected by the in-device coexistence problem. The method also includes applying a time-domain solution and/or a frequency domain solution to at least one of the one or more affected component carriers to solve the in-device coexistence problem.

20 Claims, 9 Drawing Sheets

(56) References Cited

U.S. PATENT DOCUMENTS

| | | | |
|---|---|---|---|
| 2012/0207040 A1* | 8/2012 | Comsa | H04W 72/1215 370/252 |
| 2013/0094382 A1 | 4/2013 | Ahn et al. | |
| 2013/0208641 A1* | 8/2013 | Baghel | H04B 1/109 370/311 |
| 2013/0259003 A1* | 10/2013 | Kwon | H04W 36/08 370/331 |
| 2013/0259010 A1* | 10/2013 | Jechoux | H04W 72/02 370/336 |
| 2013/0260820 A1* | 10/2013 | Schmandt | H04W 88/06 455/553.1 |
| 2013/0260821 A1* | 10/2013 | Deparis | H04W 88/06 455/553.1 |
| 2013/0272283 A1* | 10/2013 | Jechoux | H04W 84/12 370/338 |
| 2013/0273965 A1* | 10/2013 | Jechoux | H04W 88/06 455/552.1 |
| 2013/0287009 A1 | 10/2013 | Ahn et al. | |
| 2013/0295990 A1* | 11/2013 | Jechoux | H04W 88/06 455/553.1 |
| 2013/0324112 A1* | 12/2013 | Jechoux | H04W 72/1215 455/426.1 |
| 2013/0324113 A1* | 12/2013 | Jechoux | H04W 72/1215 455/426.1 |
| 2014/0269534 A1* | 9/2014 | Persson | H04W 16/14 370/329 |
| 2015/0109932 A1* | 4/2015 | Goldhamer | H04W 72/0453 370/236 |
| 2015/0382399 A1* | 12/2015 | Jechoux | H04W 88/06 455/552.1 |
| 2016/0037546 A1* | 2/2016 | Baghel | H04B 1/109 370/329 |
| 2016/0044671 A1* | 2/2016 | Baghel | H04B 1/109 370/329 |

OTHER PUBLICATIONS

"3GPP TS 36.300 V11.7.0 (Sep. 2013)", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), Sep. 19, 2013, 209 Pages.

\* cited by examiner

METHOD AND APPARATUS FOR SCHEDULING USE OF RADIO RESOURCES IN A WIRELESS NETWORK

CROSS REFERENCE TO RELATED APPLICATIONS

This application claims priority under 35 U.S.C. §119(e) to U.S. Provisional Patent Application Ser. No. 61/899,438 filed Nov. 4, 2013, the disclosure of which is incorporated by reference herein in its entirety.

BACKGROUND

Wireless networks and mobile devices allow users to access remote content, conduct voice or video calls, and/or interact with various computing and electronic devices. There is an increasing demand for more bandwidth to support real-time communications, such as VoIP, and support the higher bandwidth needs for media applications, such as streaming video. To provide increased network bandwidth for an increasing number of users, new bands of radio spectrum have been allocated to increase the overall capacity of wireless networks. Multiple radio carriers are aggregated in mobile networks to provide greater network bandwidth to mobile devices. Since new bands of spectrum are not necessarily adjacent to legacy frequency bands, carriers in different frequency bands are aggregated to provide the bandwidth desired to support various applications.

In some cases, the new frequency bands are adjacent to radio bands that mobile devices use for other purposes. Mobile devices may be equipped with multiple radios for wireless cellular networks, Wi-Fi, Bluetooth, and Global Navigation Satellite Systems (GNSS). Mobile devices use a number of these radios concurrently to support user applications. For example, while conducting a VoIP call over a wireless cellular network, a user of the mobile device may be using a Bluetooth headset for the call. Alternatively, when using a mobile device to navigate, the mobile device receives signals from navigation satellites while concurrently receiving mapping data over a wireless network. For these applications to work correctly, the radio signals of the multiple radios in the mobile device must not interfere with each other. The mobile device monitors the operation of all the radios in the mobile device to determine when a situation exists, or is anticipated, that may require assistance from the wireless network to schedule the use of radio resources to prevent interference and assure proper operation for the user.

SUMMARY

This summary is provided to introduce subject matter that is further described below in the Detailed Description and Drawings. Accordingly, this Summary should not be considered to describe essential features nor used to limit the scope of the claimed subject matter.

In general, in one aspect, this specification describes a method of scheduling a plurality of component carriers that are to be aggregated in a carrier aggregation at a network node that includes receiving an indication from a mobile device of an in-device coexistence problem, the indication comprising parameters related to the in-device coexistence problem, and determining, from the parameters in the indication, one or more of the plurality of component carriers of the carrier aggregation that are affected by the in-device coexistence problem. The method also includes applying a time-domain solution to at least one of the one or more affected component carriers and determining if the time-domain solution resolves the in-device coexistence problem. The method further includes, in response to determining that the time-domain solution does not resolve the in-device coexistence problem, applying a frequency-domain solution to reassign one or more of the affected component carriers, comprising determining if any of the one or more component carriers affected by the in-device coexistence problem are associated with a secondary serving cell and in response to determining that any of the one or more component carriers affected by the in-device coexistence problem are associated with a secondary serving cell: removing the one or more affected component carriers associated with the secondary serving cell from the carrier aggregation, and adding one or more component carriers to the carrier aggregation from one or more secondary serving cells, which are not affected by the in-device coexistence problem.

In general, in another aspect, a network node is described that includes an LTE transceiver and a processor and memory system to implement a carrier aggregation manager for scheduling a plurality of component carriers that are to be aggregated in a carrier aggregation. The carrier aggregation manager is configured to receive an indication from a mobile device of an in-device coexistence problem, the indication comprising parameters related to the in-device coexistence problem, and determine, from the parameters in the indication, one or more of the plurality of component carriers of the carrier aggregation that are affected by the in-device coexistence problem. The carrier aggregation manager is also configured to apply a time-domain solution to at least one of the one or more affected component carriers and determine if the time-domain solution resolves the in-device coexistence problem. The carrier aggregation manager is further configured, in response to the determination that the time-domain solution does not resolve the in-device coexistence problem, to apply a frequency-domain solution to reassign one or more of the affected component carriers that comprises determining if any of the one or more component carriers affected by the in-device coexistence problem are associated with a secondary serving cell; and in response to determining that any of the one or more component carriers affected by the in-device coexistence problem are associated with a secondary serving cell: remove the one or more affected component carriers associated with the secondary serving cell from the carrier aggregation, and add one or more component carriers to the carrier aggregation from one or more secondary serving cells, which are not affected by the in-device coexistence problem.

In general, in another aspect, a system is described that includes an LTE transceiver and a carrier aggregation manager for scheduling a plurality of component carriers that are to be aggregated in a carrier aggregation. The carrier aggregation manager is configured to receive an indication from a mobile device of an in-device coexistence problem, the indication comprising parameters related to the in-device coexistence problem, and determine, from the parameters in the indication, one or more of the plurality of component carriers of the carrier aggregation that are affected by the in-device coexistence problem. The carrier aggregation manager is also configured to apply a time-domain solution to at least one of the one or more affected component carriers and determine if the time-domain solution resolves the in-device coexistence problem. The carrier aggregation manager is further configured, in response to the determination that the time-domain solution does not resolve the in-device coexistence problem, to apply a frequency-domain solution to reassign one or more of the affected component carriers that comprises determining if any of the one or more component carriers affected by the in-device coexistence problem are associated with a secondary serving cell; and in response to determining that any of the one or more component carriers affected by the in-device coexistence problem are associated with a secondary serving cell: remove the one or more affected component carriers associated with the secondary serving cell from the carrier aggregation, and add one or more component carriers to the carrier aggregation from one or more secondary serving cells, which are not affected by the in-device coexistence problem.

The details of one or more implementations are set forth in the accompanying drawings and the description below. Other features and advantages will be apparent from the description and drawings.

BRIEF DESCRIPTION OF THE DRAWINGS

In the figures, the left-most digit of a reference number identifies the figure in which the reference number first appears. The use of the same reference numbers in different instances in the description and the figures indicate like elements.

DETAILED DESCRIPTION

Figure 1A:
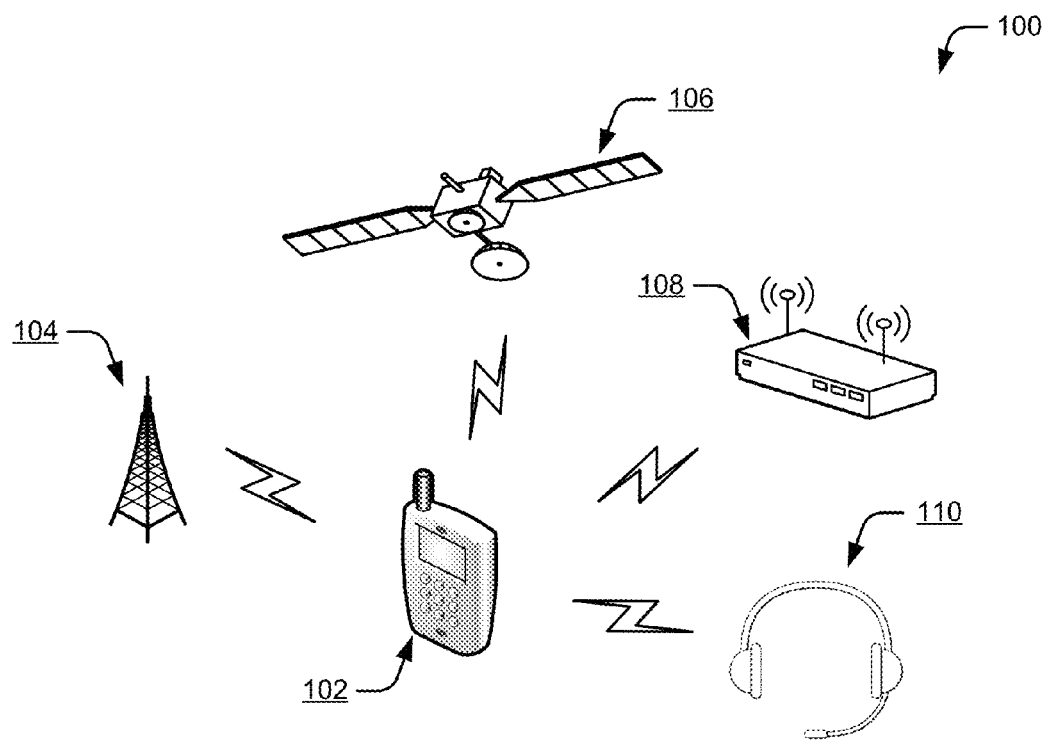
FIG. 1a illustrates an operating environment of a carrier aggregation scheduler in accordance with one or more aspects.

Mobile devices that communicate over wireless networks, such as LTE networks, include a number of radio transceivers and receivers for various purposes. In addition to a wireless wide-area network (WWAN) transceiver, such as for LTE communications, a mobile device may include a Wi-Fi transceiver for wireless LAN (WLAN) communication, a Bluetooth transceiver for wireless personal area network (WPAN) communication, and/or a global navigation satellite system (GNSS) receiver to receive navigation and timing signals. Each of the transceivers and/or receivers in the mobile device are designed to access and operate in various radio bands and to use different transmission and reception timing and media access techniques.

There is no inherent synchronization between the operation of the transceivers and/or receivers in the mobile device. RF front-end filters for each of the transceivers and/or receivers provide protection from interference when transceivers and/or receivers operate in respective frequency bands that are sufficiently separated from each other. To meet the increasing demands for wireless network bandwidth capacity, governments and regulators are providing additional spectrum for wireless wide-area networks. However, some of the radio bands in this additional spectrum are not sufficiently separated from each other for the RF front-end filters alone to provide protection from interference between the transceivers and/or receivers in the mobile device.

Additionally, to provide the wireless network bandwidth for data-intensive applications, carrier aggregation was developed to combine the bandwidth of multiple component carriers, often in multiple radio bands, to provide higher network bandwidth than can be provided by a single carrier. When an LTE network uses carrier aggregation, some of the component carriers of the carrier aggregation may interfere with other radio signals at the mobile device, or other radio signals at the mobile device may interfere with some of the LTE component carriers. In-device coexistence describes the concurrent operation of the transceivers and/or receivers in the mobile device, such that all of the transceivers and/or receivers may operate nominally without interference from one another. In-device coexistence between the transceivers and/or receivers in the mobile device is desirable to provide proper operation of many of the applications on mobile devices.

To achieve in-device coexistence, both the mobile device and the LTE network need to be involved in resolving some problems that arise. An in-device coexistence problem may arise when the timing of, or the frequency of, a radio signal from one of the transceivers and/or receivers in the mobile device interferes with the signals and operations of another of the transceivers and/or receivers in the mobile device. The LTE network does not have direct knowledge of the operation of all the transceivers and/or receivers in a mobile device, nor does the mobile device have direct control of the scheduling of radio resources of the LTE network. To solve an in-device coexistence problem, the mobile device can send a message to the LTE network indicating that there is an in-device coexistence problem that the mobile device cannot solve by itself. This message includes various parameters that describe affected carrier frequencies, discontinuous reception (DRX) parameters, and subframe configurations.

The LTE network uses the received information to formulate time-domain and/or frequency-domain solutions to assist the mobile device in resolving the in-device coexistence problem. In a carrier aggregation, only a portion of the component carriers may be affected by the in-device coexistence problem. Accordingly, it is desirable to make changes only to the affected component carriers in the carrier aggregation. In addition, some solutions to the in-device coexistence problem may be less expensive in terms of time and resources than other solutions. For example, time-domain and frequency-domain scheduling techniques applied to component carriers from secondary serving cells is preferable to performing a relatively more complex handover of the carrier aggregation, including the primary component carrier, which carries timing and control information between the LTE network and the mobile device.

The following discussion describes an operating environment, techniques that may be employed in the operating environment, and a System-on-Chip (SoC) in which components of the operating environment can be embodied. In the discussion below, reference is made to the operating environment by way of example only.

Operating Environment

FIG. 1a illustrates an example operating environment 100 having a mobile device 102 that is capable of communicating with a wide-area wireless network, such as a Long Term Evolution (LTE) network 104, a global navigation satellite system (GNSS) 106, a Wi-Fi network 108, and one or more Bluetooth devices 110. The mobile device 102 may be concurrently communicating with any combination of the LTE network 104, the GNSS 106, the Wi-Fi network 108 and/or the Bluetooth devices 110. For example, a user of the mobile device 102 may be conducting a VoIP call via the LTE network 104 using a Bluetooth headset 110 and surfing the Web over the Wi-Fi network 108. As a further example, the user may be using the mobile device 102 for the purposes of navigating while driving. The mobile device 102 receives navigation signals from GNSS 106 while concurrently downloading maps via the LTE network 104.

Figure 1B:
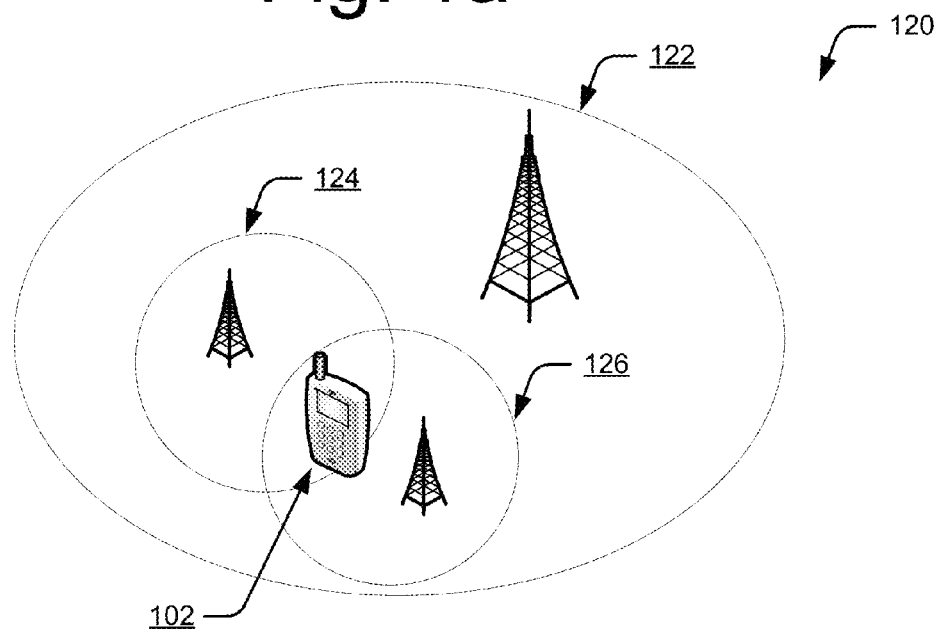
FIG. 1b illustrates an operating environment of the carrier aggregation scheduler in accordance with one or more aspects.

FIG. 1b illustrates an example operating environment 120 with the mobile device 102 and the LTE network 104 communicating using carrier aggregation. The individual carriers in the carrier aggregation are referred to as component carriers (CC). The component carriers may be in the same or different frequency bands and/or may be transmitted from the same or different serving cells. For example, a component carrier in a primary serving cell 122 of the LTE network 104 may be a primary carrier that carries network timing information and control messages to manage the radio resources that are associated with the mobile device 102. The primary carrier may be assigned to a macrocell, which covers a large geographic area, to reduce handovers to the primary carrier as the mobile device 102 changes location.

Other component carriers in the aggregation may be from secondary serving cells 124 and 126. The secondary serving cells may be small cells that may lie within the area covered by the macrocell, but that cover a smaller area than the macrocell. The small cells may provide extra capacity where there is a high volume of users or simply provide greater bandwidth than can be supported by the macrocell alone and/or a frequency band in which the primary serving cell operates.

Figure 2:
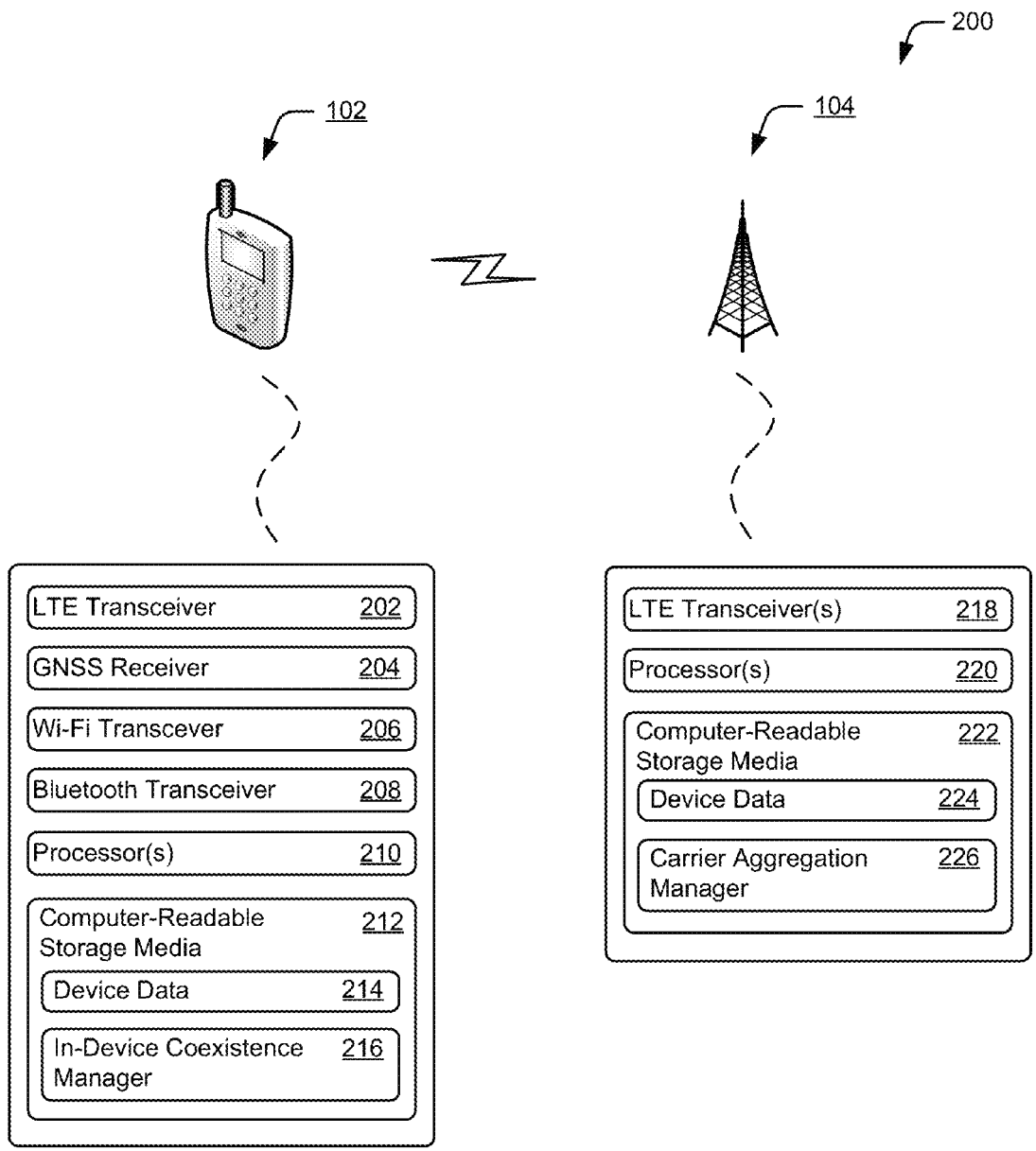
FIG. 2 illustrates example device diagrams of the carrier aggregation scheduler in accordance with one or more aspects.

FIG. 2 illustrates an example of device diagram 200 of the mobile device 102 and the LTE network 104. A LTE transceiver 202 implemented in the mobile device 102 provides communication between the mobile device 102 and the LTE network 104. A GNSS receiver 204 of the mobile device 102 receives timing and navigation signals from one or more GNSS systems, such as GPS or GLONASS. A Wi-Fi transceiver 206 of the mobile device 102 provides communication with the Wi-Fi network 108, which may represent any Wi-Fi device operating in an infrastructure mode, such as a wireless access point, or any Wi-Fi device operating in an ad-hoc mode, such as for peer-to-peer communications with a personal computer. A Bluetooth transceiver 208 of the mobile device 102 provides connectivity using any of the family of Bluetooth protocols to communicate with devices such as headsets, speakers, hands-free devices, and so forth.

The mobile device 102 also includes processor(s) 210 and computer-readable storage media 212 (CRM 212). The processor 210 may be a single core processor or a multiple core processor composed of a variety of materials, such as silicon, polysilicon, high-K dielectric, copper, and so on. CRM 212 may include any suitable memory or storage device such as random-access memory (RAM), static RAM (SRAM), dynamic RAM (DRAM), non-volatile RAM (NVRAM), read-only memory (ROM), or Flash memory useful to store device data 214 of the mobile device 102. The device data 214 includes user data, multimedia data, applications, and/or an operating system of the mobile device 102, which are executable by processor 210 to enable user interaction with the mobile device 102.

CRM 212 also includes an in-device coexistence manager 216, which, in one implementation, is embodied on CRM 212 (as shown). Alternately or additionally, the in-device coexistence manager 216 may be implemented in whole or part as hardware logic or circuitry integrated with or separate from other components of the mobile device 102. In at least some aspects, the in-device coexistence manager 216 configures the LTE transceiver 202, the GNSS receiver 204, the Wi-Fi transceiver 206, and/or the Bluetooth transceiver 208 for communication over various networks in a manner that assures in-device coexistence between the LTE transceiver 202, the GNSS receiver 204, the Wi-Fi transceiver 206, and the Bluetooth transceiver 208. How the in-device coexistence manager 216 is implemented and used varies and is described below.

Turning to the device diagram for the LTE network 104 in FIG. 2, it should be noted that only the essential features of the LTE network 104 are illustrated here for the sake of clarity. Further, the LTE network 104 shown in FIG. 2 includes a single network node (e.g. an E-UTRAN Node B, abbreviated as eNodeB or eNB). The functionality of the LTE network 104 may be distributed across multiple network nodes and/or devices, and distributed in any fashion suitable to perform the functions described herein. One or more LTE transceivers 218 provide radio communication between the LTE network 104 and one or more user devices 102. The LTE network 104 also includes processor(s) 220 and computer-readable storage media 222 (CRM 222). The processor 220 may be a single core processor or a multiple core processor composed of a variety of materials, such as silicon, polysilicon, high-K dielectric, copper, and so on. CRM 222 may include any suitable memory or storage device such as random-access memory (RAM), static RAM (SRAM), dynamic RAM (DRAM), non-volatile RAM (NVRAM), read-only memory (ROM), or Flash memory useful to store device data 224 of the LTE network 104. The device data 224 includes network scheduling data, radio resource management data, applications, and/or an operating system of the LTE network 104, which are executable by processor 220 to enable communication with the mobile device 102.

CRM 222 also includes a carrier aggregation manager 226, which, in one implementation, is embodied on CRM 222 (as shown). Alternately or additionally, the carrier aggregation manager 226 may be implemented in whole or part as hardware logic or circuitry integrated with or separate from other components of the LTE network 104. In at least some aspects, the carrier aggregation manager 226 configures the LTE transceivers 218 for communication with the mobile devices 102. How the carrier aggregation manager 226 is implemented and used varies and is described below.

The multiple transceivers and/or receivers in the mobile device 102 operate in a variety of frequency bands and use differing media access techniques for access to their respective radio access technologies. For example, Wi-Fi uses carrier sense multiple access (CSMA) for media access control and transmits asynchronously, compared to the timing of the frame structure of LTE with frame and subframes on 10 ms and 1 ms boundaries, respectively. Further, Bluetooth is a frequency-hopped spread spectrum system that hops between channels every 625 μs, which is also not time-aligned with the frame and subframe boundaries of LTE.

The in-device coexistence manager 216 monitors the operation of the multiple transceivers and/or receivers in the mobile device 102 to determine if radio signals will coincide in time and/or frequency causing in-device coexistence interference, which cannot be resolved solely by filtering the interfering signals with the RF filters of the mobile device 102. The situation, where filtering the interfering signals cannot achieve in-device coexistence, is referred to as an in-device coexistence problem. If the in-device coexistence manager 216 cannot solve the in-device coexistence problem, the in-device coexistence manager 216 sends a message to the LTE network 104 indicating that there is an in-device coexistence problem.

Figure 3:
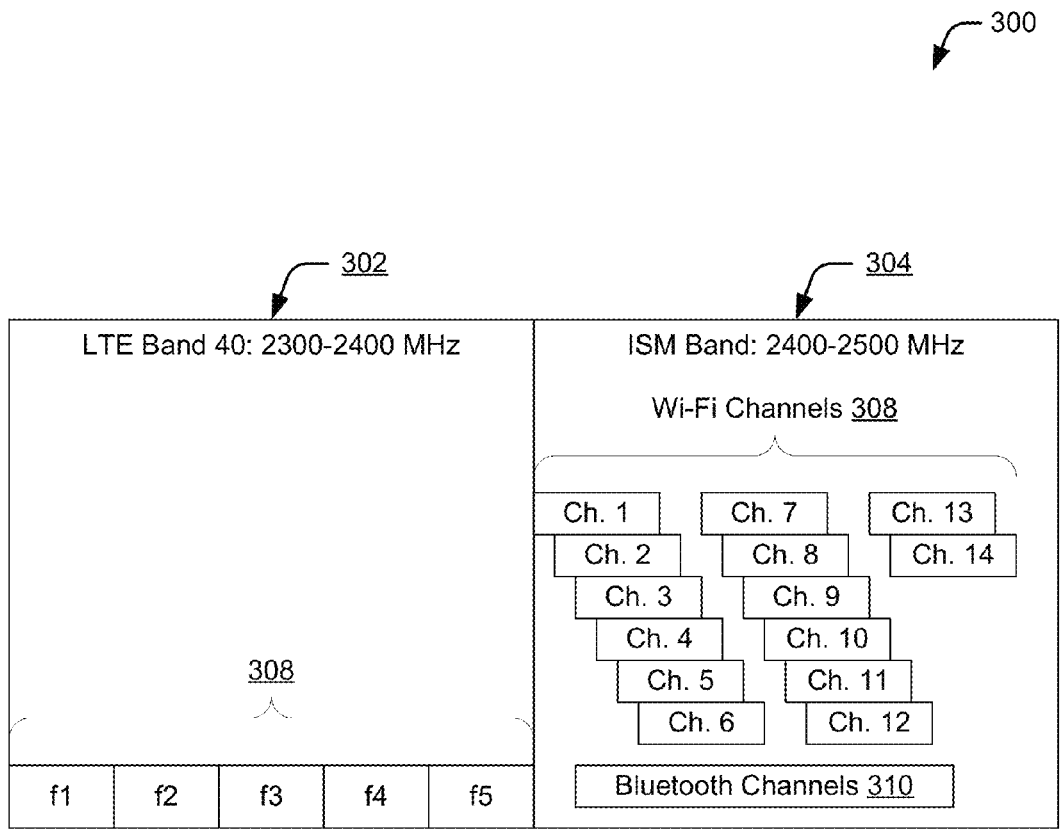
FIG. 3 illustrates radio frequency band details of an operating environment of the carrier aggregation scheduler in accordance with one or more aspects.

FIG. 3 illustrates a portion of radio spectrum that includes LTE band 40, from 2300 to 2400 MHz, shown at 302. An industrial, scientific, and medical (ISM) band is adjacent to LTE band 40, from 2400 MHz to 2500 MHz, shown at 304. (It should be noted that the frequency allocations for this ISM band may vary somewhat across regions of the world, however those variations are not significant with respect to the invention described herein.)

In this example, five frequency bands, f1-f5, are shown within LTE band 40, at 306. The LTE network 104 can allocate any of the five frequency bands for component carriers of a carrier aggregation. In the adjacent ISM band, multiple users share the band of frequencies according to rules for unlicensed operation. These rules are designed to allow the multiple users to operate without generating undue interference to each other. For example, Wi-Fi and Bluetooth both operate in this band using overlapping channels but with different modulation and media access techniques to share the radio resources of the ISM band. Wi-Fi channels are shown at 308 and the block of Bluetooth channels are shown at 310.

The radio systems operating in the ISM band, although designed independently of each other, are designed to be tolerant to the operation of each other. However, the design of the systems in the ISM band do not take into account the operation of LTE in adjacent portions of LTE band 40. Out-of-band emissions from a transmitter, operating near the boundary between these bands, can interfere with a receiver operating near the boundary in the other of these two bands. Interference can also occur from a harmonic or sub-harmonic of a transmitting frequency from the radios in the mobile device. Due to the close proximity of the multiple receivers and transceivers in the mobile device 102, whether operating on adjacent frequencies or harmonically-related frequencies, the interference power coming from a transmitter in the mobile device 102 may be much higher than the received power of a desired signal in a receiver of the mobile device 102. This situation causes interference that results in an in-device coexistence (IDC) problem that the mobile device 102 cannot solve by itself, either by filtering interfering signals or changing the timing of operations of radios in the mobile device 102.

The LTE network 104 has knowledge of how the mobile device 102 is configured for communication with the LTE network 104, but the LTE network 104 has no inherent knowledge of the existence or operation of other radios in the mobile device 102. To address this situation, the 3GPP Release 11 standard defines an InDeviceCoexIndication message that allows the mobile device 102 to send to the LTE network 104 an indication of an in-device coexistence problem that the mobile device 102 cannot solve by itself.

InDeviceCoexIndication Message:

```
InDeviceCoexIndication-r11 ::=            SEQUENCE {
        criticalExtensions                    CHOICE {
            c1                                    CHOICE {
                inDeviceCoexIndication-r11            InDeviceCoexIndication-r11-IEs,
                spare3 NULL, spare2 NULL, spare1 NULL
            },
            criticalExtensionsFuture              SEQUENCE { }
        }
}
InDeviceCoexIndication-r11-IEs ::= SEQUENCE {
        affectedCarrierFreqList-r11           AffectedCarrierFreqList-r11      OPTIONAL,
        tdm-AssistanceInfo-r11                TDM-AssistanceInfo-r11           OPTIONAL,
        lateNonCriticalExtension              OCTET STRING                     OPTIONAL,
        nonCriticalExtension                  SEQUENCE { }                     OPTIONAL
}
        AffectedCarrierFreqList-r11 ::= SEQUENCE (SIZE (1..maxFreqIDC-r11)) OF AffectedCarrierFreq-r11
AffectedCarrierFreq-r11 ::= SEQUENCE {
        carrierFreq-r11                       MeasObjectId,
        interferenceDirection-r11             ENUMERATED {eutra, other, both, spare}
}
        TDM-AssistanceInfo-r11 ::= CHOICE {
            drx-AssistanceInfo-r11                SEQUENCE {
                                                      drx-CycleLength-r11
                                                          ENUMERATED {sf40, sf64, sf80, sf128,
                                                          sf160, sf256, spare2, spare1},
                drx-Offset-r11                        INTEGER (0..255) OPTIONAL,
                drx-ActiveTime-r11                    ENUMERATED {sf20, sf30, sf40, sf60, sf80,
                                                          sf100, spare2, spare1}
            },
            idc-SubframePatternList-r11           IDC-SubframePatternList-r11,
            ...
}
IDC-SubframePatternList-r11 ::= SEQUENCE (SIZE (1..maxSubframePatternIDC-r11)) OF IDC-
SubframePattern-r11
```

```
IDC-SubframePattern-r11 ::= CHOICE {
        subframePatternFDD-r11              BIT STRING (SIZE (4)),
        subframePatternTDD-r11              CHOICE {
            subframeConfig0-r11                 BIT STRING (SIZE (70)),
            subframeConfig1-5-r11               BIT STRING (SIZE (10)),
            subframeConfig6-r11                 BIT STRING (SIZE (60))
        },
        ...
}
```

For example, the mobile device 102 determines there is an IDC problem that the mobile device 102 cannot solve by itself. The mobile device 102 sends the InDeviceCoexIndication message to the LTE network 104 to initiate a procedure to resolve the IDC problem. The mobile device 102 includes information elements (IE) in the InDeviceCoexIndication message. The mobile device 102 lists affected LTE carrier frequencies and interference directions in an affectedCarrierFreqList IE in the InDeviceCoexIndication message to assist in resolving the IDC problem using frequency-domain approaches. The mobile device 102 includes Discontinuous Reception (DRX) and/or subframe pattern information in a TDM-AssistanceInfo IE in the InDeviceCoexIndication message to assist in resolving IDC problem using time-domain approaches.

The mobile device 102 may also send the InDeviceCoexIndication message with updated conditions for the IDC problem, including cases where the mobile device 102 no longer suffers from the IDC problem. In the case of a handover of the mobile device 102, the IDC assistance information is transferred from the source serving cell to the destination serving cell. The various approaches to the IDC problem, in the frequency-domain and in the time-domain, are described below.

Frequency-Domain Coexistence

Typically a radio has a bandpass filter coupled to the antenna used to transmit and/or receive. The bandpass filter in a transmitter attenuates out-of-band signals produced in the radio so that the levels of the out-of-band signals are acceptably low when transmitted. The bandpass filter in a receiver attenuates out-of-band signals, such as adjacent channel signals, so that undesirable signals will not be stronger than a desired in-band signal. However, while using RF front-end filters is always part of a solution for in-device coexistence interference, the isolation provided by the filters alone may not be sufficient when the frequency of an interfering transmitter is immediately adjacent, or harmonically-related, to the channel of the desired signal at the receiver. For example, referring to FIG. 3, the upper frequency band in LTE band 40 is directly adjacent to Wi-Fi channel 1 in the ISM band.

One possible solution is to insert a guard-band of frequencies in the spectrum between two potentially interfering radios. For example, a network operator could choose not to use frequency band f5, which would provide a frequency guard-band to allow the RF filters to sufficiently attenuate signals that might interfere between radios. The downside of this solution is giving up a band of spectrum (frequency band f5 in this case) which reduces spectrum efficiency for the network operator, reducing the overall bandwidth the network operator can provide to customers for communication.

Alternatively, the LTE network 104 could respond to the indication of the IDC problem by performing a handover to move traffic with the mobile device 102 to a frequency that will not be affected by, or cause, interference. However, handovers are a relatively complex procedure, which may, in many cases, be avoided by using time-domain or alternative frequency-domain approaches to solve the IDC problem.

Figure 4:
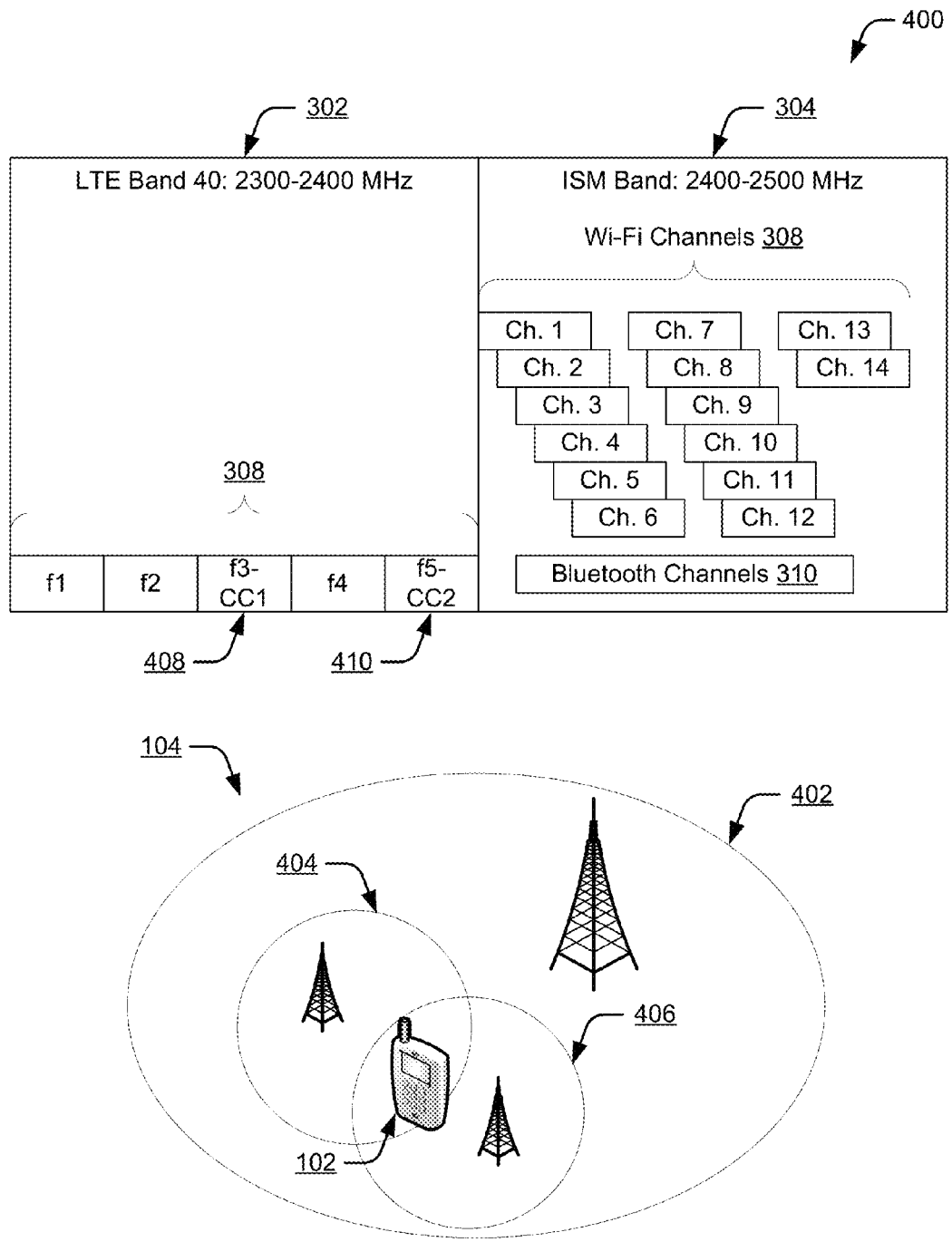
FIG. 4 illustrates an operating environment of the carrier aggregation scheduler in accordance with one or more aspects.

In an example, FIG. 4 illustrates the mobile device 102 configured for communication using carrier aggregation with the LTE network 104. The mobile device 102 is communicating using an aggregation of a primary carrier in a macrocell 402, a component carrier CC1 from a small cell 404 and a second component carrier CC2 from a small cell 406. The component carriers CC1 and CC2 are assigned to the frequency bands f3 and f5, respectively, in LTE band 40, as shown at 408 and 410. In this example, the component carrier CC1 is 40 MHz below the ISM band 304. The component carrier CC1 is sufficiently separated in frequency from the ISM band 304 that it does not create an IDC problem for the mobile device 102.

However, in this example, the component carrier CC2 is immediately adjacent to the ISM band 304. The use of the component carrier CC2 for LTE communications by the mobile device 102 concurrently with communication in the ISM band 304, for example using channel 3 of the Wi-Fi channels 308, can create IDC interference that the mobile device 102 cannot resolve on its own. The mobile device 102 sends the InDeviceCoexIndication message to the LTE network 104. The mobile device 102 lists the component carrier CC2 in the affectedCarrierFreqList IE of the InDeviceCoexIndication message, as well as the interference direction associated with the component carrier CC2. The interference direction indicates that there is interference to the effective carrier frequency of the LTE communication, interference to communications to other radios in the mobile device 102, or both.

In response to receiving the InDeviceCoexIndication message from the mobile device 102, the carrier aggregation manager 226 in the LTE network 104 can evaluate the information included in the InDeviceCoexIndication message to determine if there is a frequency-domain solution to resolve the IDC problem. The carrier aggregation manager 226 evaluates the received information along with other information relating to the scheduling of other traffic between the LTE network 104 and other mobile devices 102.

For example, the carrier aggregation manager 226 may determine to perform a handover of the traffic being transmitted on the component carrier CC2 of the carrier aggregation to a different carrier frequency. Alternatively, the carrier aggregation manager 226 may decide to discontinue use of the component carrier CC2, which resolves the IDC problem, but also reduces the bandwidth of the carrier aggregation.

Time-Domain Coexistence

Figure 5:
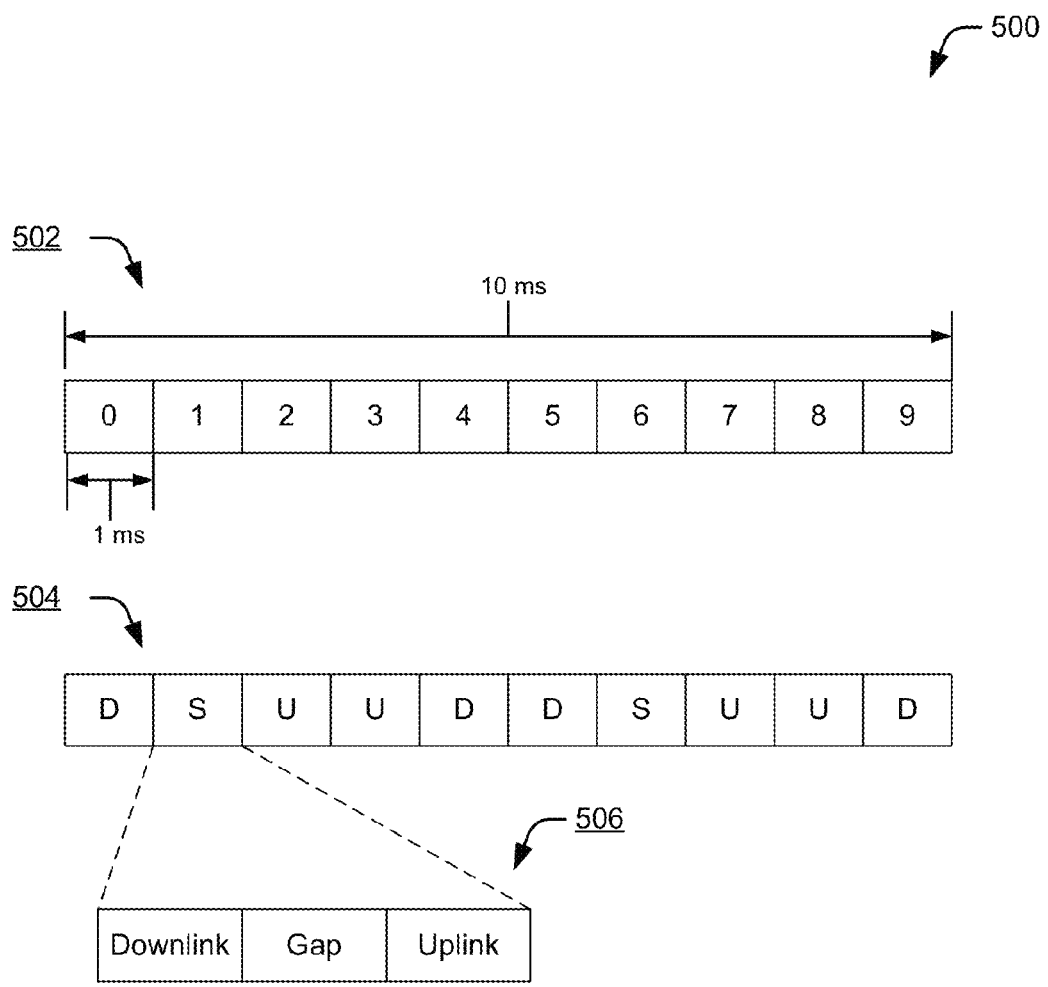
FIG. 5 illustrates LTE frame and subframe details of an operating environment of the carrier aggregation scheduler in accordance with one or more aspects.

FIG. 5 illustrates a time-domain representation of LTE frame and subframe structure. The LTE frame contains 10 subframes, numbered 0-9, shown at 502. The LTE frame is 10 ms long and each subframe is 1 ms long. The subframes in the LTE frame can be configured in various ways as defined in the 3GPP standards. For example, when the LTE network 104 is configured for Time-Division LTE (TD-LTE), subframes can be used for downlink, uplink, or designated as special. For example, TD-LTE Uplink-Downlink Configuration 1 with 5 ms switch point periodicity is illustrated at 504. The subframes designated for downlink are labeled "D", the subframes designated for uplink are labeled "U," and the special subframes are labeled "S." The special subframes are divided into three slots with a slot for downlink, a gap slot, and a slot for uplink, as shown at 506. It should be noted that although a TD-LTE frame is illustrated in FIG. 5, in-device coexistence problems can exist in both Time Division Duplex (TDD) LTE and Frequency Division Duplex (FDD) LTE communications. The solutions discussed herein apply to both TDD and FDD LTE network communication.

One time-domain approach to resolving the IDC problem is adjusting DRX parameters in order to reduce potential time overlaps in which LTE signals and other signals are concurrently transmitted or received by radios in the mobile device 102. The TDM-AssistanceInfo IE sent in the InDeviceCoexIndication message contains sub-IEs that describe the DRX configuration of the mobile device 102. The sub IEs are a drx-CycleLength that describes the DRX cycle length, a drx-Offset that describes a DRX starting offset in the DRX cycle, and a drx-ActiveTime that describes the amount of time that the mobile device 102 will be active during each DRX cycle.

The DRX cycle is relatively long compared to the LTE frame. The LTE DRX cycle may be 40 to 256 ms long. For example, in response to receiving the TDM-AssistanceInfo IE at the LTE network 104, the carrier aggregation manager 226 adjusts the scheduling of traffic to the mobile device 102 and adjusts the DRX parameters for the mobile device 102, such that the mobile device 102 has a shorter drx-ActiveTime. By reducing the drx-ActiveTime, there will be more time during which the other radios in the mobile device 102 will not interfere with, or receive interference from, LTE communications. Adjusting DRX parameters reduces the probability of in-device coexistence problems occurring with non-synchronized communication, such as Wi-Fi and Bluetooth, by providing longer periods of time without active LTE communications between the mobile device 102 and the LTE network 104.

Alternatively when performing carrier aggregation, DRX may only need to be applied selectively to affected carrier frequencies. Returning to our example in FIG. 4, the carrier aggregation manager 226 may only need to adjust DRX parameters for the component carrier CC2. The primary carrier and the component carrier CC1 are not affected by interference in this example. The carrier aggregation manager 226 applies DRX, or alters DRX parameters, only for the component carrier CC2.

LTE uses a combination of error detection and error correction referred to as Hybrid Automatic Repeat Request (HARQ). HARQ combines error detection and retransmission, with Forward Error Correction (FEC) that sends FEC data to correct errors that occur in transmission. A number of processes and subframes are used for HARQ in LTE. As an alternative to using DRX to solve the IDC problem, HARQ subframe puncturing may be employed to solve the IDC problem by reserving some of the LTE HARQ subframes for communications by the other radios in the mobile device 102 instead of the LTE HARQ subframes.

For example, mobile device 102 sends a subframe pattern list to the LTE network 104 in an idc-SubframePatternList sub-IE of the TDM-AssistanceInfo IE. The SubframePatternList includes a bitmap indicating which subframes are reserved for LTE communications and which subframes will be punctured to achieve IDC with the other radios in the mobile device 102. In response to receiving the idc-SubframePatternList sub-IE, the carrier aggregation manager 226 determines which subframes are reserved for HARQ puncturing and configures the LTE network 104 to refrain from using the reserved subframes for LTE packet communication. HARQ puncturing provides an opportunity for periodic traffic, such as Bluetooth, to coexist with an LTE voice call. The longer on/off cycle of DRX blocks Bluetooth voice communication for periods of time during the LTE voice call, but HARQ puncturing provides more frequent, periodic opportunities for the frequency-hopped Bluetooth radio signal to coexist with the LTE radio signals.

Alternatively, when performing carrier aggregation, HARQ puncturing may only need to be applied selectively to affected carrier frequencies. Returning to our example in FIG. 4, HARQ puncturing may only be needed for the component carrier CC2. The primary carrier and the component carrier CC1 are not affected by interference in this example. The carrier aggregation manager 226 may decide to apply HARQ puncturing only to subframes transmitted on the component carrier CC2.

Techniques for Scheduling Use of Radio Resources in a Wireless Network

The following discussion describes techniques for the carrier aggregation scheduler. These techniques can be implemented using the previously described environments or entities, such as the carrier aggregation manager 226 of FIG. 2 embodied in an LTE network 104. These techniques include methods illustrated in FIGS. 6-8, each of which is shown as a set of operations performed by one or more entities. These methods are not necessarily limited to the orders shown for performing the operations. Further, these methods may be used in conjunction with one another, in whole or in part, whether performed by the same entity, separate entities, or any combination thereof. In portions of the following discussion, reference will be made to operating environments 100 and 400 of FIGS. 1 and 4, as well as entities of device environment 200 of FIG. 2 by way of example. Such reference is not to be taken as limited to operating environments 100 and 400 but rather as illustrative of one of a variety of examples.

Figure 6:
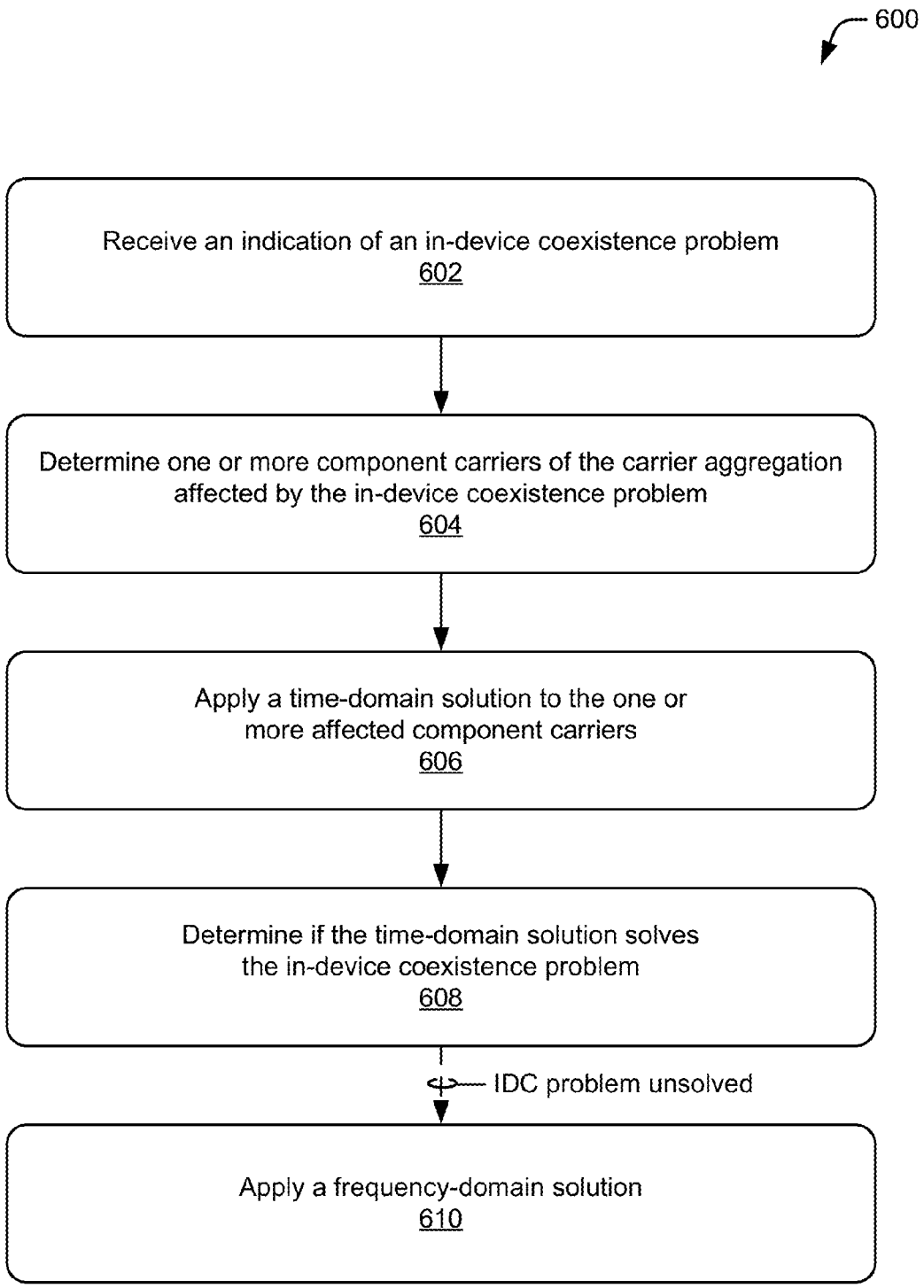
FIG. 6 illustrates a method of solving an in-device coexistence problem in accordance with one or more aspects.

FIG. 6 depicts a method 600 of configuring the LTE network 104, including operations performed by the carrier aggregation manager 226 of FIG. 2. At 602, an indication of an in-device coexistence problem is received. For example, a carrier aggregation scheduler of a network node receives the indication of the in-device coexistence problem, where the indication includes parameters related to the in-device coexistence problem. By way of example, the mobile device 102 sends an indication of an in-device coexistence problem to the carrier aggregation manager 226 of the LTE network 104. The indication of the in-device coexistence problem includes parameters related to the in-device coexistence problem. For example, the mobile device 102 may be receiving packets over an LTE carrier aggregation that includes a portion of LTE band 40 that is immediately adjacent to the ISM band in which the mobile device 102 is conducting Wi-Fi communications. The indication of the in-device coexistence problem includes frequency-domain-related and time-domain-related information that can be used by the carrier aggregation manager 226 to assist the mobile device 102 in solving the in-device coexistence problem.

At 604, component carriers of the carrier aggregation that are affected by the in-device coexistence problem are determined. For example, the carrier aggregation manager 226 determines the component carriers that are affected from the AffectedCarrierFreqList IE in the indication of the in-device coexistence problem received from the mobile device 102.

At 606, a time-domain solution is applied to resolve the in-device coexistence problem. For example, the carrier aggregation manager 226 evaluates the TDM-AssistanceInfo IE in the indication of the in-device coexistence problem to determine and apply a time-domain solution to resolving the in-device coexistence problem. Based on the content of the TDM-AssistanceInfo IE, the carrier aggregation manager 226 applies either a DRX or a HARQ puncturing solution to the affected component carriers of the carrier aggregation, as described in greater detail in method 800, to apply the time-domain solution to resolving in-device coexistence problem.

At 608, a determination is made as to whether the time-domain solution resolves the in-device coexistence problem. If the time-domain solution was sufficient to solve the in-device coexistence problem, then no other solution is applied. If the time-domain solution was not sufficient to resolve the in-device coexistence problem, then a frequency-domain solution is applied, at 610, to resolve the in-device coexistence problem. For example, the carrier aggregation manager 226 determines that the time-domain solution does not resolve the in-device coexistence problem for the mobile device 102, either because the time-domain solution fails to solve the specific problem for the mobile device 102, or the time-domain solution is not compatible with scheduling traffic for one or more other mobile devices 102 being served by the LTE network 104. The carrier aggregation manager 226 evaluates information elements in the indication of the in-device coexistence problem to determine a frequency-domain solution to solve the in-device coexistence problem, which is described in detail in method 700.

Figure 7:
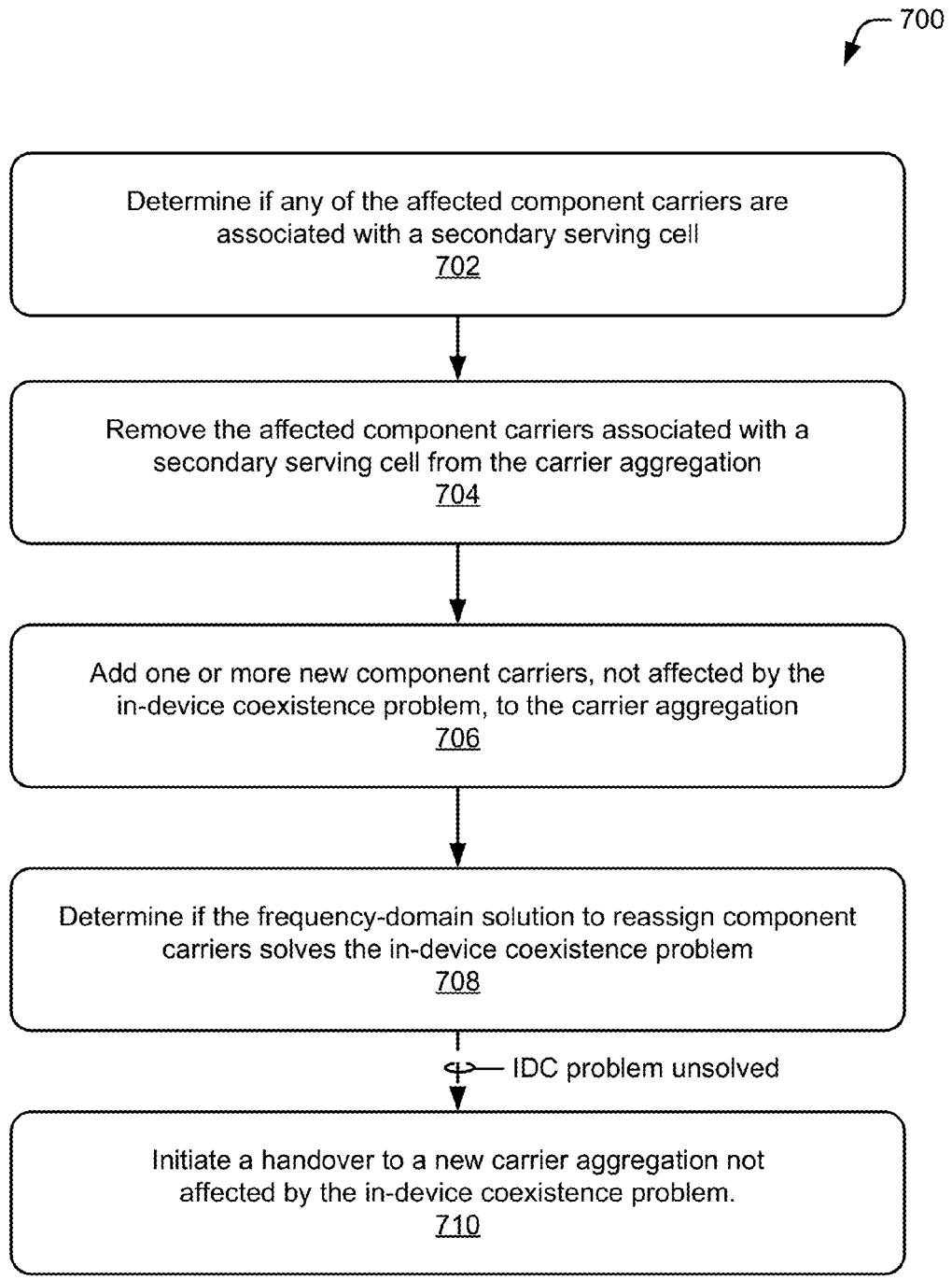
FIG. 7 illustrates a method of solving an in-device coexistence problem with a frequency-domain solution in accordance with one or more aspects.

FIG. 7 depicts a method 700 of configuring the LTE network 104, including operations performed by the carrier aggregation manager 226 of FIG. 2. At 702, affected component carriers in the indication of the in-device coexistence problem are evaluated to determine if the affected component carriers are associated with a secondary serving cell. For example, carrier aggregation manager 226 compares the affected component carriers identified in the AffectedCarrierFreqList IE with radio resource management or other network scheduling information to determine if the affected component carriers are being provided by secondary serving cells in the LTE network 104.

At 704, the affected component carriers that are associated with secondary serving cells are removed from the carrier aggregation for packet communication between the mobile device and the LTE network. For example, the carrier aggregation manager 226 removes the assigned resources of the affected component carriers from the carrier aggregation.

At 706, one or more new component carriers, which are not affected by the in-device coexistence problem, are added to the carrier aggregation. For example, carrier aggregation manager 226 assigns one or more component carriers to the carrier aggregation using carriers from secondary serving cells that are not affected by the in-device coexistence problem.

At 708, a determination is made as to whether reassigning component carriers from secondary serving cells resolves the in-device coexistence problem. If the reassigning component carriers from secondary serving cells was sufficient to solve the in-device coexistence problem, then no further solution is applied. If the frequency-domain solution of reassigning component carriers from secondary serving cells was not sufficient to resolve the in-device coexistence problem, for example, the primary carrier is affected by in-device co-existence, then a handover is initiated to a new primary carrier and new carrier aggregation that is not affected by the in-device coexistence problem, at 710.

For example, the carrier aggregation manager 226 determines that frequency-domain solution of reassigning component carriers from secondary serving cells does not solve the in-device coexistence problem for the mobile device 102. The in device coexistence problem is unsolved because the reassignment of component carriers fails to solve the IDC problem for the mobile device 102, reassignment of component carriers is not compatible with scheduling traffic for one or more other mobile devices 102 being served by the LTE network 104, or the primary carrier is affected by the in-device co-existence problem. Carrier aggregation manager 226 initiates a handover to a new carrier aggregation of component carriers from a primary serving cell and one or more secondary serving cells.

Figure 8:
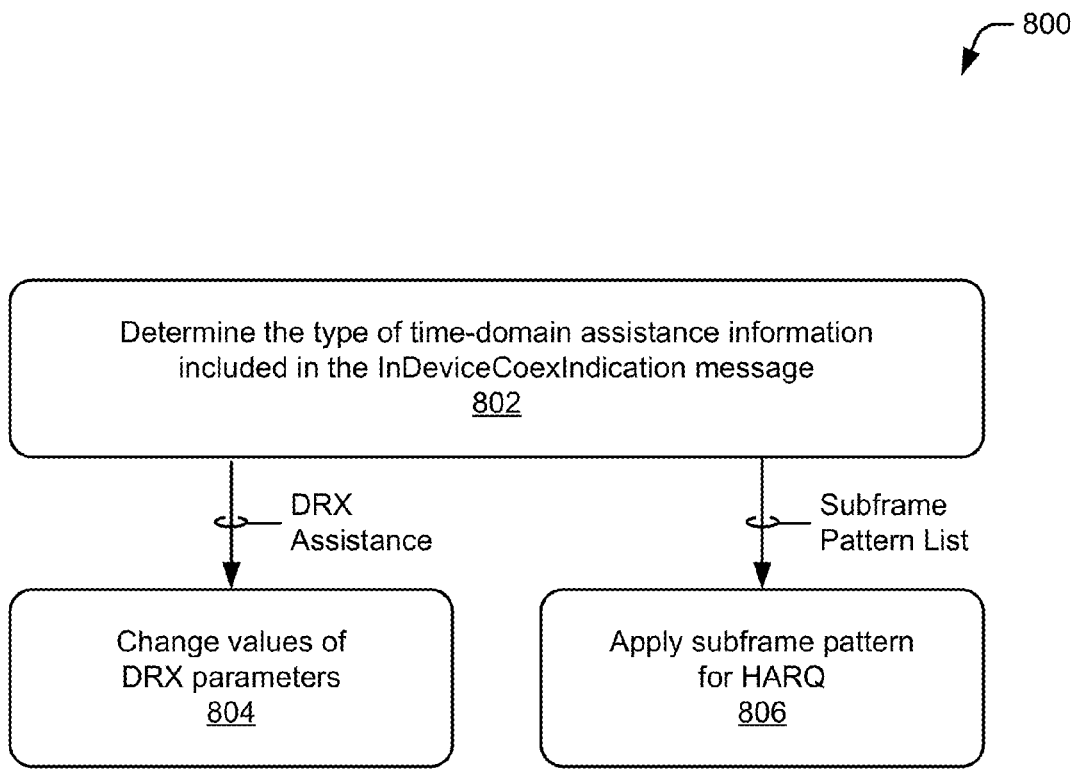
FIG. 8 illustrates a method of solving an in-device coexistence problem with a time-domain solution in accordance with one or more aspects.

FIG. 8 depicts a method 800 of configuring the LTE network 104, including operations performed by the carrier aggregation manager 226 of FIG. 2. At 802, time-domain assistance information in the indication of an in-device coexistence problem is evaluated to determine the type of time-domain solution to apply to the in-device coexistence problem. By way of example, the carrier aggregation manager 226 determines whether a TDM-AssistanceInfo IE includes a drx-AssistanceInfo sub-IE or a idc-SubframePatternList sub-IE.

At 804, in response to determining that DRX assistance information was provided in the indication of the in-device coexistence problem, a time-domain solution to the in-device coexistence problem is formed using the DRX assistance information. For example, if the time-domain solution solves the in-device coexistence problem, the carrier aggregation scheduler changes values of DRX parameters related to the mobile device.

By way of example, the carrier aggregation manager 226 evaluates values of a drx-CycleLength, a drx-Offset, and a drx-ActiveTime included in the drx-AssistanceInfo sub-IE to determine if the DRX assistance information provides a time-domain solution to the in-device coexistence problem. If the time-domain solution based on the DRX assistance information solves in-device coexistence problem, then carrier aggregation manager 226 applies the values in the DRX assistance information to the affected carriers of the carrier aggregation. If the DRX assistance information fails to provide a time-domain solution that solves the in-device coexistence problem, then the carrier aggregation manager 226 turns to using a frequency-domain solution as described in methods 600 and 700 above.

At 806, in response to determining that a subframe pattern list was provided in the indication of the in-device coexistence problem, a time-domain solution to the in-device coexistence problem is formed using the subframe pattern list. For example, if the time-domain solution solves the in-device coexistence problem, the carrier aggregation scheduler changes the subframe pattern used by the affected carriers in the carrier aggregation.

By way of example, the carrier aggregation manager 226 evaluates an IDC-SubframePattern included in the idc-SubframePatternList sub-IE to determine if the subframe pattern list provides a time-domain solution to the in-device coexistence problem. If the time-domain solution based on the subframe pattern list solves in-device coexistence problem, then carrier aggregation manager 226 applies the subframe pattern list to the affected carriers of the carrier aggregation. If the subframe pattern list fails to provide a time-domain solution that solves the in-device coexistence problem, then the carrier aggregation manager 226 turns to using a frequency-domain solution as described in methods 600 and 700 above.

System-on-Chip

Figure 9:
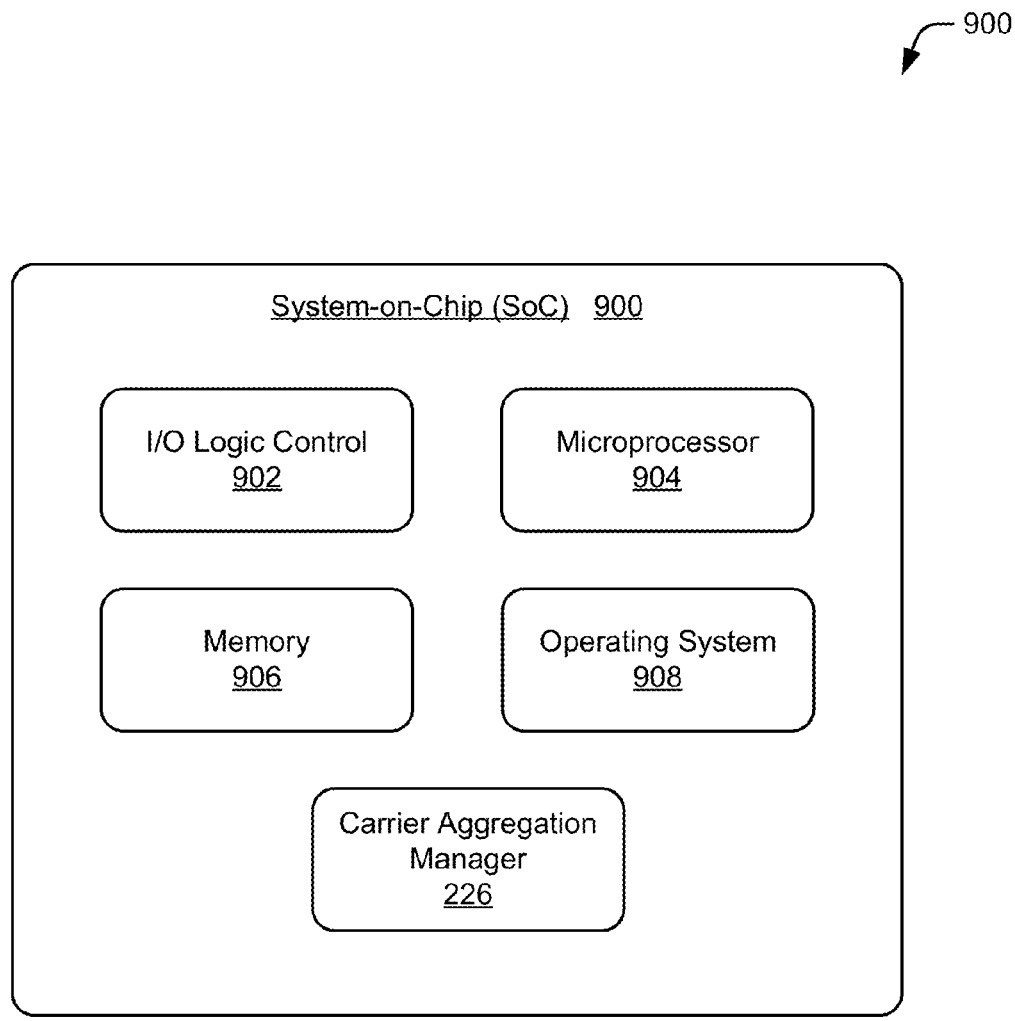
FIG. 9 illustrates a System-on-Chip (SoC) environment for implementing aspects of the techniques described herein.

FIG. 9 illustrates a System-on-Chip (SoC) 900, which can implement various aspects of the carrier aggregation scheduler as described above. A SoC can be implemented in any suitable device, such as a Base Transceiver Station (BTS), Base Station Controller (BSC), a Node B (NB), an Evolved Node B (eNB), a Radio Network Controller (RNC), or any suitable network node or device.

SoC 900 can be integrated with electronic circuitry, a microprocessor, memory, input-output (I/O) logic control, communication interfaces and components, other hardware, firmware, and/or software needed to provide communicative coupling for a device, such as any of the above-listed devices. SoC 900 can also include an integrated data bus or crossbar (not shown) that couples the various components of the SoC for data communication between the components. A network node that includes SoC 900 can also be implemented with many combinations of differing components. In some cases, these differing components may be configured to implement concepts described herein over various types of wireless connections.

In this example, SoC 900 includes various components such as an input-output (I/O) logic control 902 (e.g., to include electronic circuitry) and a microprocessor 904 (e.g., any of a microcontroller or digital signal processor). SoC 900 also includes a memory 906, which can be any type of RAM, low-latency nonvolatile memory (e.g., Flash memory), ROM, and/or other suitable electronic data storage. SoC 900 can also include various firmware and/or software, such as an operating system 908, which can be computer-executable instructions maintained by memory 906 and executed by microprocessor 904. SoC 900 can also include other various communication interfaces and components, communication components, other hardware, firmware, and/or software.

SoC 900 includes the carrier aggregation manager 226 (embodied as disparate or combined components as noted above). Examples of these various components, functions, and/or entities, and their corresponding functionality, are described with reference to the respective components of the environment 200 shown in FIG. 2.

The carrier aggregation manager 226, either independently or in combination with other entities, can be implemented as computer-executable instructions maintained by memory 906 and executed by microprocessor 904 to implement various embodiments and/or features described herein. The carrier aggregation manager 226 may also be provided integral with other entities of the SoC, such as integrated with one or both of I/O logic controller 902 or any communication and/or network interface within, or associated with, SoC 900. Alternatively or additionally, the carrier aggregation manager 226 and the other components can be implemented as hardware, firmware, fixed logic circuitry, or any combination thereof that is implemented in connection with the I/O logic control 902 and/or other signal processing and control circuits of SoC 900.

Further aspects of the present disclosure relate to one or more of the following clauses.

A method of scheduling a plurality of component carriers that are to be aggregated in a carrier aggregation at a network node includes receiving, at the network node, an indication from a mobile device of an in-device coexistence problem, the indication comprising parameters related to the in-device coexistence problem, and determining, from the parameters in the indication, one or more of the plurality of component carriers of the carrier aggregation that are affected by the in-device coexistence problem. The method also includes applying a time-domain solution to at least one of the one or more affected component carriers and determining if the time-domain solution resolves the in-device coexistence problem. The method further includes, in response to determining that the time-domain solution does not resolve the in-device coexistence problem, applying a frequency-domain solution to reassign one or more of the affected component carriers that comprises determining if any of the one or more component carriers affected by the in-device coexistence problem are associated with a secondary serving cell, and in response to determining that any of the one or more component carriers affected by the in-device coexistence problem are associated with a secondary serving cell, (i); removing the one or more affected component carriers associated with the secondary serving cell from the carrier aggregation, and (ii) adding one or more component carriers added from the one or more secondary serving cells are from one or more secondary serving cells to the carrier aggregation, the one or more new component carriers added from the one or more secondary service cells not being affected by the in-device coexistence problem.

The method further includes determining that the frequency-domain solution to reassign the component carriers does not resolve the in-device coexistence problem; and in response to the determining that the reassignment of the component carriers does not resolve the in-device coexistence problem, initiating a handover of the mobile device to a new carrier aggregation comprising component carriers that are not affected by the in-device coexistence problem.

In the method, the parameters in the indication of the in-device coexistence problem further comprise discontinuous reception (DRX)-related assistance information usable to create the applied time-domain solution.

The method further includes the time-domain solution comprising changing values of DRX parameters for the one or more affected component carriers, the changed values of the DRX parameters being effective to preclude transmission of a radio signal from coinciding with reception of another radio signal at the mobile device.

In the method, the parameters in the indication of the in-device coexistence problem further comprise desired subframe reservation pattern related assistance information usable to create the time-domain solution.

The method further includes the time-domain solution comprising applying the subframe reservation pattern for Hybrid Automatic Repeat Request (HARQ) puncturing of the one or more affected component carriers, the applied subframe reservation pattern being effective to preclude transmission of a radio signal from coinciding with reception of another radio signal at the mobile device.

In the method, resolving the in-device coexistence problem for the mobile device further comprises the network node rebalancing packet scheduling for other mobile devices.

In the method, the in-device coexistence problem is interference between radio signals at the mobile device that the mobile device cannot resolve without assistance from the network node, and the resolution of the in-device coexistence problem removes the interference between the radio signals at the mobile device.

A network node includes an LTE transceiver, and a processor and memory system to implement a carrier aggregation manager for scheduling a plurality of component carriers that are to be aggregated in a carrier aggregation. The carrier aggregation manager is configured to receive an indication from a mobile device of an in-device coexistence problem, the indication comprising parameters related to the in-device coexistence problem, and determine, from the parameters in the indication, one or more of the plurality of component carriers of the carrier aggregation that are affected by the in-device coexistence problem. The carrier aggregation manager is also configured to apply a time-domain solution to at least one of the one or more affected component carriers and determine if the time-domain solution resolves the in-device coexistence problem. The carrier aggregation manager is further configured, in response to the determination that the time-domain solution does not resolve the in-device coexistence problem, apply a frequency-domain solution to reassign one or more of the affected component carriers that comprises determining if any of the one or more component carriers affected by the in-device coexistence problem are associated with a secondary serving cell; and in response to the determination that any of the one or more component carriers affected by the in-device coexistence problem are associated with a secondary serving cell, (i) remove the one or more affected component carriers associated with the secondary serving cell from the carrier aggregation, and (ii) add one or more component carriers from one or more secondary serving cells to the carrier aggregation, the one or more new component carriers added from the one or more secondary service cells not being affected by the in-device coexistence problem.

In the network node, the carrier aggregation manager is further configured to determine that the frequency-domain solution to reassign the component carriers does not resolve the in-device coexistence problem; and in response to the determination that the reassignment of the component carriers does not resolve the in-device coexistence problem, initiate a handover of the mobile device to a new carrier aggregation comprising component carriers that are not affected by the in-device coexistence problem.

In the network node, the parameters in the indication of the in-device coexistence problem further comprise discontinuous reception (DRX)-related assistance information usable to create the applied time-domain solution.

In the network node, the time-domain solution comprising changing values of DRX parameters for the one or more affected component carriers, the changed values of the DRX parameters being effective to preclude transmission of a radio signal from coinciding with reception of another radio signal at the mobile device.

In the network node, the parameters in the indication of the in-device coexistence problem further comprise desired subframe reservation pattern related assistance information usable to create the time-domain solution.

In the network node, the time-domain solution comprising applying the subframe reservation pattern for Hybrid Automatic Repeat Request (HARQ) puncturing of the one or more affected component carriers, the applied subframe reservation pattern being effective to preclude transmission of a radio signal from coinciding with reception of another radio signal at the mobile device.

In the network node, the carrier aggregation manager is further configured to resolve the in-device coexistence problem for the mobile device further comprises the network node rebalancing packet scheduling for other mobile devices.

In the network node, the in-device coexistence problem is interference between radio signals at the mobile device that the mobile device cannot resolve without assistance from the network node, and the resolution of the in-device coexistence problem removes the interference between the radio signals at the mobile device.

A system for scheduling a plurality of component carriers that are to be aggregated in a carrier aggregation, the system includes an LTE transceiver, and a carrier aggregation manager. The carrier aggregation manager is configured to receive an indication from a mobile device of an in-device coexistence problem, the indication comprising parameters related to the in-device coexistence problem, and determine, from the parameters in the indication, one or more of the plurality of component carriers of the carrier aggregation that are affected by the in-device coexistence problem. The carrier aggregation manager is also configured to apply a time-domain solution to at least one of the one or more affected component carriers and determine if the time-domain solution resolves the in-device coexistence problem. The carrier aggregation manager is further configured, in response to the determination that the time-domain solution does not resolve the in-device coexistence problem, apply a frequency-domain solution to reassign one or more of the affected component carriers that comprises determining if any of the one or more component carriers affected by the in-device coexistence problem are associated with a secondary serving cell; and in response to the determination that any of the one or more component carriers affected by the in-device coexistence problem are associated with a secondary serving cell, (i) remove the one or more affected component carriers associated with the secondary serving cell from the carrier aggregation, and (ii) add one or more new component carriers from one or more secondary serving cells to the carrier aggregation, the one or more new component carriers added from the one or more secondary service cells not being affected by the in-device coexistence problem.

In the system, the carrier aggregation manager is further configured to determine that the frequency-domain solution to reassign the component carriers does not resolve the in-device coexistence problem; and in response to the determination that the reassignment of the component carriers does not resolve the in-device coexistence problem, initiate a handover of the mobile device to a new carrier aggregation comprising component carriers that are not affected by the in-device coexistence problem.

In the system, the parameters in the indication of the in-device coexistence problem further comprise discontinuous reception (DRX)-related assistance information usable to create the applied time-domain solution, and the time-domain solution comprising changing values of DRX parameters for the one or more affected component carriers, the changed values of the DRX parameters being effective to preclude transmission of a radio signal from coinciding with reception of another radio signal at the mobile device.

In the system, the parameters in the indication of the in-device coexistence problem further comprise desired subframe reservation pattern related assistance information usable to create the time-domain solution, and the time-domain solution comprising applying the subframe reservation pattern for Hybrid Automatic Repeat Request (HARQ) puncturing of the one ore more affected component carriers, the applied subframe reservation pattern being effective to preclude transmission of a radio signal from coinciding with reception of another radio signal at the mobile device.

Although the subject matter has been described in language specific to structural features and/or methodological operations, it is to be understood that the subject matter defined in the appended claims is not necessarily limited to the specific features or operations described above, including orders in which they are performed.

What is claimed is:

1. A method for scheduling a plurality of component carriers that are to be aggregated in a carrier aggregation at a network node, the method comprising:
   receiving, at the network node, an indication from a mobile device of an in-device coexistence problem, the indication comprising parameters related to the in-device coexistence problem;
   determining, from the parameters in the indication, one or more of the plurality of component carriers of the carrier aggregation that are affected by the in-device coexistence problem;
   applying a time-domain solution to at least one of the one or more affected component carriers;
   determining if the time-domain solution resolves the in-device coexistence problem;
   in response to determining that the time-domain solution does not resolve the in-device coexistence problem, applying a frequency-domain solution to reassign one or more of the affected component carriers comprising:
      determining if any of the one or more component carriers affected by the in-device coexistence problem are associated with a secondary serving cell, and
      in response to determining that any of the one or more component carriers affected by the in-device coexistence problem are associated with a secondary serving cell, (i) removing the one or more affected component carriers associated with the secondary serving cell from the carrier aggregation, and (ii) adding one or more component carriers from one or more secondary serving cells to the carrier aggregation, wherein the one or more component carriers added from the one or more secondary serving cells are not affected by the in-device coexistence problem;
   determining that the frequency-domain solution to reassign the component carriers does not resolve the in-device coexistence problem; and
   in response to the determining that the reassignment of the component carriers does not resolve the in-device coexistence problem, initiating a handover of the mobile device to a new carrier aggregation comprising component carriers that are not affected by the in-device coexistence problem.

2. The method of claim 1, wherein the parameters in the indication of the in-device coexistence problem further comprise discontinuous reception (DRX)-related assistance information usable to create the applied time-domain solution.

3. The method of claim 2, wherein the time-domain solution comprises changing values of DRX parameters for the affected one or more component carriers, the changed values of the DRX parameters being effective to preclude transmission of a radio signal from coinciding with reception of another radio signal at the mobile device.

4. The method of claim 1, wherein the parameters in the indication of the in-device coexistence problem further comprise desired subframe reservation pattern related assistance information usable to create the time-domain solution.

5. The method of claim 4, wherein the time-domain solution comprises applying the subframe reservation pattern for Hybrid Automatic Repeat Request (HARQ) puncturing of the affected one or more component carriers, the applied subframe reservation pattern being effective to preclude transmission of a radio signal from coinciding with reception of another radio signal at the mobile device.

6. The method of claim 1, wherein resolving the in-device coexistence problem for the mobile device further comprises the network node rebalancing packet scheduling for other mobile devices.

7. The method of claim 1, wherein the in-device coexistence problem is interference between radio signals at the mobile device that the mobile device cannot resolve without assistance from the network node, and wherein resolution of the in-device coexistence problem removes the interference between the radio signals at the mobile device.

8. A network node, comprising:
   an LTE transceiver; and
   a processor and memory system to implement a carrier aggregation manager for scheduling a plurality of component carriers that are to be aggregated in a carrier aggregation, the carrier aggregation manager configured to:
   receive, via the LTE transceiver, an indication from a mobile device of an in-device coexistence problem, the indication comprising parameters related to the in-device coexistence problem;
   determine, from the parameters in the indication, one or more of the plurality of component carriers of a carrier aggregation that are affected by the in-device coexistence problem;
   apply a time-domain solution to at least one of the one or more affected component carriers;
   determine if the time-domain solution resolves the in-device coexistence problem;
   in response to a determination that the time-domain solution does not resolve the in-device coexistence problem, apply a frequency-domain solution to reassign one or more of the affected component carriers that comprises:
      determine if any of the one or more component carriers affected by the in-device coexistence problem are associated with a secondary serving cell; and
         in response to the determination that any of the one or more component carriers affected by the in-device coexistence problem are associated with a secondary serving cell, (i) remove the one or more affected component carriers associated with the secondary serving cell from the carrier aggregation, and (ii) add one or more component carriers from one or more secondary serving cells to the carrier aggregation, wherein the one or more component carriers added from the one or more secondary service cells are not affected by the in-device coexistence problem;
   determine that the frequency-domain solution to reassign the component carriers does not resolve the in-device coexistence problem; and
   in response to the determination that the reassignment of the component carriers does not resolve the in-device coexistence problem, initiate a handover of the mobile device to a new carrier aggregation comprising component carriers that are not affected by the in-device coexistence problem.

9. The network node of claim 8, wherein the parameters in the indication of the in-device coexistence problem further comprise discontinuous reception (DRX)-related assistance information usable to create the time-domain solution.

10. The network node of claim 9, wherein the time-domain solution comprises changing values of DRX parameters for the one or more affected component carriers, the changed values of the DRX parameters being effective to preclude transmission of a radio signal from coinciding with reception of another radio signal at the mobile device.

11. The network node of claim 8, wherein the parameters in the indication of the in-device coexistence problem further comprise a desired subframe reservation pattern related assistance information usable to create the time-domain solution.

12. The network node of claim 11, wherein the time-domain solution comprises applying the subframe reservation pattern for Hybrid Automatic Repeat Request (HARQ) puncturing of the affected one or more component carriers, the applied subframe reservation pattern being effective to preclude transmission of a radio signal from coinciding with reception of another radio signal at the mobile device.

13. The network node of claim 8, wherein the carrier aggregation manager further configured to resolve the in-device coexistence problem for the mobile device by rebalancing packet scheduling for other mobile devices using the affected component carriers.

14. The network node of claim 8, wherein the in-device coexistence problem is interference between radio signals at the mobile device that the mobile device cannot resolve without assistance from the network node, and wherein resolution of the in-device coexistence problem removes the interference between the radio signals at the mobile device.

15. A system for scheduling a plurality of component carriers that are to be aggregated in a carrier aggregation, the system comprising:
   an LTE transceiver; and
   a processor and memory system comprising instructions to implement a carrier aggregation manager, the instructions executable to configure the system to:
      receive, via the LTE transceiver, an indication from a mobile device of an in-device coexistence problem, the indication comprising parameters related to the in-device coexistence problem;
      determine, from the parameters in the indication, one or more of the plurality of component carriers of the carrier aggregation that are affected by the in-device coexistence problem;
      apply a time-domain solution to at least one of the one or more affected component carriers;
      determine if the time-domain solution resolves the in-device coexistence problem;
      in response to a determination that the time-domain solution does not resolve the in-device coexistence problem, apply a frequency-domain solution to reassign one or more of the affected component carriers that comprises:
         determine if any of the one or more component carriers affected by the in-device coexistence problem are associated with a secondary serving cell; and
         in response to the determination that any of the one or more component carriers affected by the in-device coexistence problem are associated with a secondary serving cell, (i) remove the one or more affected component carriers associated with the secondary serving cell from the carrier aggregation, and (ii) add one or more component carriers from one or more secondary serving cells to the carrier aggregation, wherein the one or more component carriers added from the one or more secondary service cells are not affected by the in-device coexistence problem;
      determine that the frequency-domain solution to reassign the component carriers does not resolve the in-device coexistence problem; and
      in response to the determination that the reassignment of the component carriers does not resolve the in-device coexistence problem, initiate a handover of the mobile device to a new carrier aggregation comprising component carriers that are not affected by the in-device coexistence problem.

16. The system of claim 15, wherein the parameters in the indication of the in-device coexistence problem further comprise discontinuous reception (DRX)-related assistance information usable to create the time-domain solution.

17. The system of claim 16, wherein the time-domain solution comprises changing values of DRX parameters for the one or more affected component carriers, the changed values of the DRX parameters being effective to preclude transmission of a radio signal from coinciding with reception of another radio signal at the mobile device.

18. The system of claim 15, wherein the parameters in the indication of the in-device coexistence problem further comprise a desired subframe reservation pattern related assistance information usable to create the time-domain solution.

19. The system of claim 18, wherein the time-domain solution comprises applying the subframe reservation pattern for Hybrid Automatic Repeat Request (HARQ) puncturing of the one or more affected component carriers, the applied subframe reservation pattern being effective to preclude transmission of a radio signal from coinciding with reception of another radio signal at the mobile device.

20. The system of claim 15, wherein resolving the in-device coexistence problem for the mobile device further comprises the system rebalancing packet scheduling for other mobile devices.

* * * * *